(12) United States Patent
Chan

(10) Patent No.: US 12,019,934 B1
(45) Date of Patent: Jun. 25, 2024

(54) MIRRORED HOT FOLDER FOR PRINTING

(71) Applicant: KYOCERA Document Solutions Inc., Osaka (JP)

(72) Inventor: Sam Chinh Co Tang Chan, Garden Grove, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/208,290

(22) Filed: Jun. 11, 2023

(51) Int. Cl.
G06F 3/12 (2006.01)
G06F 16/16 (2019.01)

(52) U.S. Cl.
CPC .......... G06F 3/127 (2013.01); G06F 3/1205 (2013.01); G06F 16/164 (2019.01)

(58) Field of Classification Search
CPC ...... G06F 3/127; G06F 3/1205; G06F 16/164; G06F 3/1228; G06F 3/1204
See application file for complete search history.

(56) References Cited

U.S. PATENT DOCUMENTS

| | | | |
|---|---|---|---|
| 11,079,993 B2 | 8/2021 | Kubota | |
| 2012/0162705 A1* | 6/2012 | Kodama | G06F 3/1265 358/1.15 |
| 2012/0182580 A1* | 7/2012 | Yamashita | G06F 3/1203 358/1.16 |
| 2012/0194862 A1* | 8/2012 | Fukuda | G06F 3/1256 358/1.15 |
| 2013/0286432 A1* | 10/2013 | Matsuyama | G06F 3/1296 358/1.15 |
| 2020/0272394 A1* | 8/2020 | Kubota | G06F 3/127 |

* cited by examiner

*Primary Examiner* — Iriana Cruz (74) *Attorney, Agent, or Firm* — W. Eric Webostad (57) ABSTRACT

Systems and methods relate generally to printing. In a method, a data file for a print job is dropped into a hot folder. The hot folder is monitored for the dropping. Responsive to detection of the dropping, a syncing of a mirrored folder to the hot folder is triggered to create a mirrored file of the data file. Responsive to expiration of the data file in the hot folder, the syncing is stopped; an internal folder is created in a temporary file system; the mirrored folder is accessed for the mirrored file; the mirrored file is moved from the mirrored folder to the internal folder; and the data file in the hot folder is deleted.

20 Claims, 7 Drawing Sheets

MIRRORED HOT FOLDER FOR PRINTING

FIELD

The following description relates to printing. More particularly, the following description relates to mirroring a hot folder for printing of a print job.

BACKGROUND

Generally, a "hot folder" serves as a staging area for items stored therein to be used for some purpose. A hot folder may be continuously monitored, so when files or other items are copied to, pasted to, dropped in, or otherwise put in association with such hot folder, such items are automatically processed according to a predefined layout. For example, Breeze Systems (https://www.breezesys.com/) has created a software tool ("tool") known as a "Hotfolder Prints." This tool for photographers and photobooth operators wanting to automatically lay out images and print them. The tool monitors a folder for recently added images, and when threshold quantities of images recently added images into a page ready format from a for printing. Such page may then be automatically printed or saved as an image for later use. This tool uses various layout options for different images on a page with size and orientation variations together with a background, overlay and captions. Another example is tool known as "Hotfolder" from Mediarich (available from Equilibrium (https://equilibrium.com/hotfolder/)). This tool allows content files to be batch processed and delivered.

SUMMARY

In accordance with one or more below described examples, a method relating generally to printing is disclosed. In such a method, a data file for a print job is dropped into a hot folder. The hot folder is monitored for the dropping. Responsive to detection of the dropping, a syncing of a mirrored folder to the hot folder is triggered to create a mirrored file of the data file. Responsive to expiration of the data file in the hot folder, the syncing is stopped; an internal folder is created in a temporary file system; the mirrored folder is accessed for the mirrored file; the mirrored file is moved from the mirrored folder to the internal folder; and the data file in the hot folder is deleted. In accordance with one or more below described examples, a system relating generally to printing is disclosed. In such a system, a printer system has a memory configured to store program code; a processor coupled to the memory; and a printer engine configured for execution of printer operations. In combination and response to executing the program code, the printer system is configured to initiate operations for implementing a process for the printing. In the process, a data file for a print job is dropped into a hot folder. They hot folder is monitored for the dropping. Responsive to detection of the dropping, a syncing of a mirrored folder to the hot folder is triggered to create a mirrored file of the data file. Responsive to expiration of the data file in the hot folder, the syncing is stopped; an internal folder is created in a temporary file system; the mirrored folder is accessed for the mirrored file; the mirrored file is moved from the mirrored folder to the internal folder; and the data file in the hot folder is deleted.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

The CIP4.Organization or CIP4.org has developed exchange message and data formats. Basically a JDF or Job Definition Format is a process automation specification. An XJDF (Exchange Job Definition Format) assumes that a job ticket exists as an internal representation within a management application. Along those lines, an XJDF describes an interface between management applications and applications that execute instructions, namely an extensible, SML-based information interchange interface. An XJDF specifies an interchange format between two applications that are assumed to have an internal data model that is not necessarily based on XJDF. A JMF or Job Messaging Format is communication format with multi-level capabilities providing a command and control language for a JDF. An Exchange Job Messaging Format or XJMF an extensible form of a JMF.

In a conventional document handling system, a printer or printer system may only receive a print job from a normal protocol, such as for example port 9100, lpr, or ftp. Print job settings ("job settings") may be obtained from a printer driver ("driver"). In another example, job settings might not be provided from a driver. In either example, a print job output may be delayed waiting for a print job in a shared print folder than having to be copied to a system folder for printing.

A printer system, like a computer, may operate under a network protocol. For a printer system, a Samba protocol, file transfer protocol ("FTP"), Server Message Block ("SMB") protocol, Web Distributed Authoring and Versioning ("WebDAV") extensions to a Hypertext Transfer Protocol ("HTTP"), or other printer system usable protocol may be used where one or more folders may be shared via such protocol.

A "hot folder" or "hotfolder" may be provided via a printer shared network folder, and this hot folder may or may not have user defined job setting. As described below in additional detail, when a hot folder is created or shared, a mirrored folder therefor may be created. A print job file ("job file") copied to or loaded to such a hot folder may be simultaneously streamed to such a mirrored folder. Once such a job file is expired, such a mirrored folder may be used an internal temporary system folder for printing such a job file without having to wait for moving such job file from such a hot folder to an internal temporary system folder.

A printer system can have a configuration application ("app") or webpage so a user may configure or add a shared hot folder. A hot folder may have printer job settings, including one or more default job settings. These settings may be used for printing with one or more user preferences, such as page sizing, stapling, punching, or other preference. Each hot folder of a printer system may have one or more defined file expiration times, such as for each type of supported file extension. An expiration period of time is an interval in which a printer system waits before a job file may be processed out of such hot folder by such a printer system.

When one or more files is/are detected or discovered as being in a hot folder, such one or more files may be simultaneously streamed into a synchronized or mirrored folder. During this time of streaming, a file may be deleted or resynchronized in such a hot folder by a user. When a file is completely copied or loaded into a shared hot folder, a synchronized or mirrored folder may be expected to have such copied or loaded file too. Along those lines, a job file n a mirrored folder may be ready for immediate processing for readying and subsequent printing rather than having to wait for such a job file to be copied from a hot folder for subsequent processing. This direct access to a job file without having to copy same out of a hot folder may shorten time to print. Additionally, having an additional copy of a job file may be used to verify such two files are the same to prevent using a corrupted file, such as by comparing error correction codes or parity.

With the above general understanding borne in mind, various configurations for systems, and methods therefor, for printing are generally described.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or revent]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc., may be used herein to describe various elements, these elements should bot be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

Figure 1:
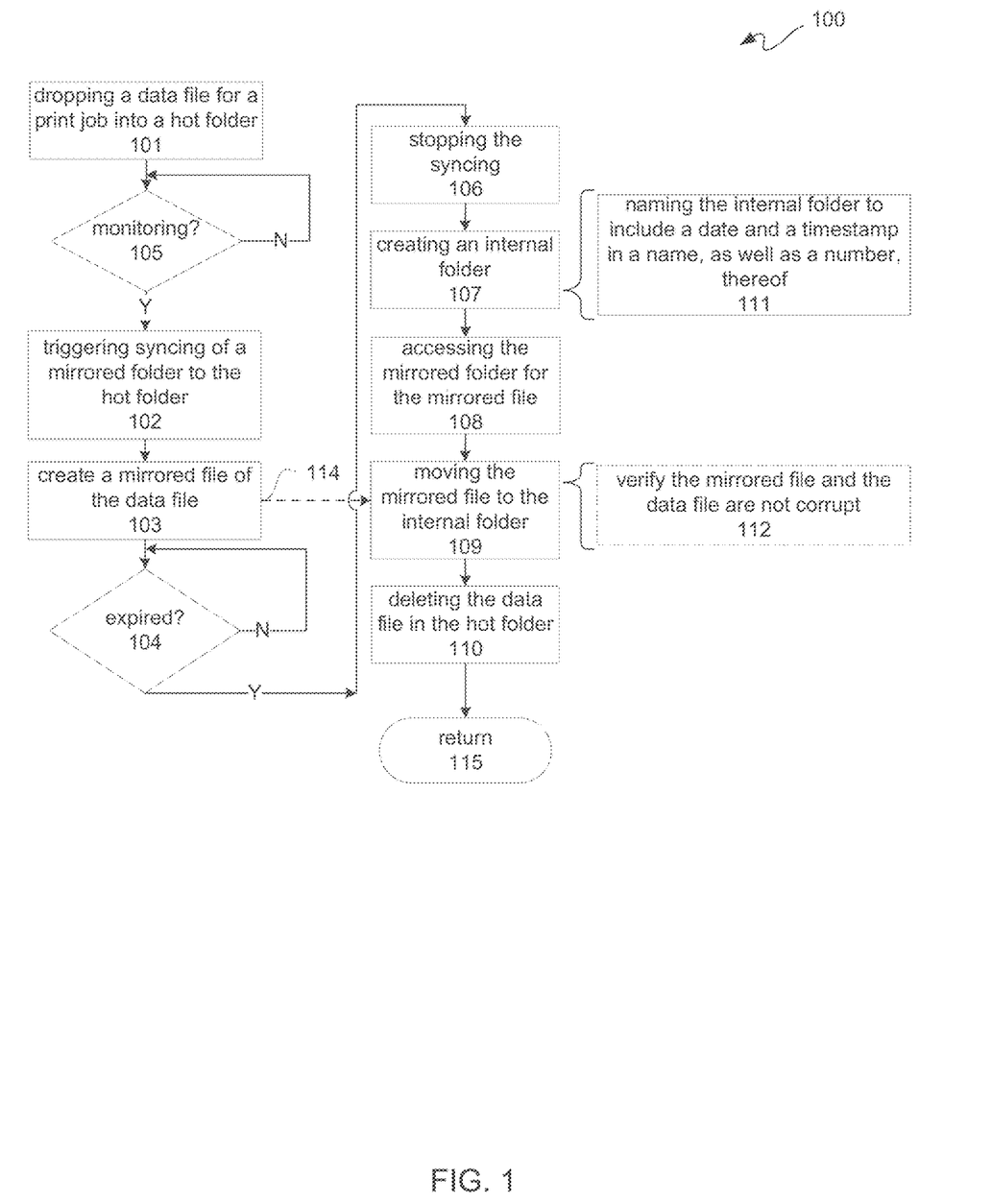
FIG. 1 is a flow diagram depicting an example of a printing flow.
Figure 3:
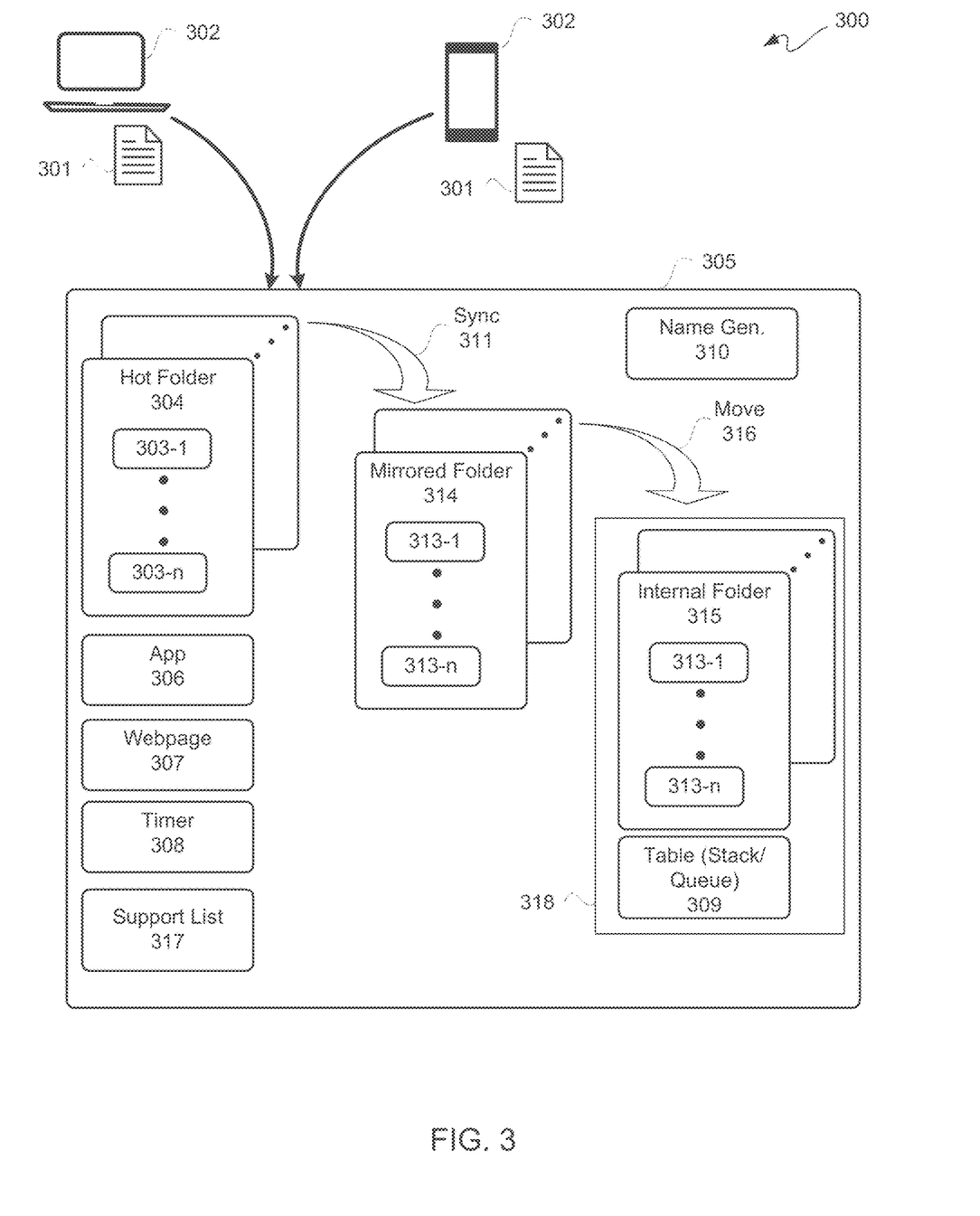
FIG. 3 is a block diagram depicting an example of a networked system for print jobs using a hot folder.

FIG. 1 is a flow diagram depicting an example of a printing flow 100. FIG. 3 is a block diagram depicting an example of a networked system 300 for printing flow 100 of FIG. 1. With simultaneous reference to FIGS. 1 and 3, printing flow 100 and networked system 300 are further described.

At operation 101, one or more data files 303-1 through 303-n (for n a positive integer greater than 1; hereinafter, singly and collective "data file 303") forming a print job 301 may be provided, namely "dropped," from a user device 302 into or to a "hot folder" or "htofolder" 304, which may be a shared networked folder of a printer system 305. A printer system 305 may include a multi-function printer or other type of printer configured as described herein.

A user device 302 may be a notebook computer, a desktop computer, a smart phone, a tablet, a terminal, a web/cloud computer, or other electronic device capable of providing a print job 301 to a printer system 305. Moreover, communication of a print job 301 from a user device 302 to a printer system 305 may be wired or wireless.

In this example, printer system 305 is coupled to or part of a network. For purposes of clarity by way of example and not limitation, printer system 305 may be configured to use a Samba protocol ("Samba"), where folders can be share via such protocol. Again, in another example, a different file or folder sharing protocol may be used, such as for example previously stated. Printer system 305 may include a configuration application ("app") 306 or a webpage 307 to allow a user device 302 to configure or add hot folder 304 for access to such hot folder 304. Hot folder 304 may be a network shared folder shared by a printer system 305. With access to a hot folder 304, a user may load, drop, paste, or otherwise input or add one or more data files 303 to such hot folder 304.

At operation 105, monitoring of such a hot folder 304 may be continuously run in a loop to check for addition of data file 303 to such hot folder. Even though a single hot folder 304 is described for purposes of clarity by way of example, in another example there may be multiple hot folders 304, as generally indicated with ellipses, as shared networked folders of a printer system 305. If no data file 303 is detected in a hot folder 304, then such detection loop returns to check again. Such a loop may be delayed by some amount of time between checks, such as every 5 to 10 seconds or so, depending upon an application.

If, however, at operation 105 a data file 303 is detected in a hot folder 304, then at operation 102 synchronizing or mirroring 311 of such a hot folder 304 to a corresponding mirrored folder 314 may be initiated or triggered. If such a mirrored folder 314 is not present, then such a mirrored folder 314 may be created as part of such triggering at operation 105. However, for purposes of clarity and not limitation, it shall be assumed that a mirrored folder 314 exists for each corresponding hot folder 304 responsive to creation of such hot folder.

At operation 103, a mirrored file may be created in a mirrored folder 314 for each corresponding data file 303 in a hot folder 304. For example, mirrored files 313-1 through 313-n (hereinafter singly and collectively "mirrored file 313") may be created for data file 303.

At operation 104, a continuous loop for checking for an expired file, namely an expired data file 303, in hot folder 304 may be performed. If no expired data file 303 is detected in a hot folder 304, then such detection loop returns to check again. Such a loop may be delayed by some amount of time between checks, such as every 5 to 10 seconds or so, depending upon an application. During this time interval, a user may yet be able to delete a data file 303 in a hot folder 304, and thus likewise causing deletion of a corresponding mirrored file 313 in a mirrored folder 314. If a data file 303 is deleted prior to expiration as determined at operation 104, then printing flow 200 may return to monitoring at operation 105.

If, however, at operation 104 an expired data file 303 is detected, then at operation 106 syncing 311 with respect to such expired data file 303 may be stopped. At operation 107, an internal temporary file system folder ("internal folder") 315 may be created.

As part of operation 107, a unique name may be generated for creation of such internal folder 315. Along those lines, at operation 111 of operation 107, and internal folder map be named to include a date and a timestamp of creation of such internal folder. Having data and timestamp in a name may not be sufficient for uniqueness in some applications, and so additionally an index number may be included in such name. For example, such an index number may be generated sequentially, and restarted each 24-hour cycle, for each data file 303 dropped into a hot folder 304. Printer system 305 may include a name generator 310 configured to generate a data, timestamp and index number name. Along those lines, name generator 310 may include a counter to count dropped data files into one or more hot folders to provide such index number.

At operation 108, a mirrored folder 315 having a mirrored file 313 of an expired data file 303 detected at 104 may be accessed to access such mirrored file. At operation 109 such mirrored file 313 may be moved 316 directly, as generally indicated by dashed arrow 114, to a corresponding and associated internal folder 315. In other words, mirrored file 313 is moved directly from mirrored folder 314 to internal folder 315 in a temporary file system 318 without having to access an associated hot folder 304. For example, such an internal folder 315 may correspond to a mirrored folder 314 for moving data file 303-1 through 303-n to such internal folder. By moving such mirrored file to an internal folder effectively such mirrored file may be a hidden expired file in such system folder.

When one or more files is/are detected or discovered as being in a hot folder 304 such as operation 105, such one or more files may be simultaneously streamed into a synchronized or mirrored folder 314 at operation 103. During this time of streaming, a data file 303 may be deleted or resynchronized in such a hot folder 304 by a user. When a data file 303 is completely copied or loaded into a shared hot folder 304, a synchronized or mirrored folder 314 may be expected to have such copied or loaded file too. Along those lines, a print job the ("job file"), such as a mirrored file 313, in a mirrored folder 314 may be ready for immediate processing for readying for printing and subsequent printing rather than having to wait for such a job file to be copied from a hot folder for subsequent processing. This direct access, as generally indicated by arrow 114, to a job file, such as a mirrored file 313, without having to wait to copy same out of a hot folder 304 may shorten time to print. Additionally, having an additional copy of a job file, such as a mirrored file 313 for example, may optionally be used at operation 112 of operation 109 to verify such two files, namely data the 304 and mirrored file 313, are the same to prevent using a moved corrupted file. For example, a data file 303 and a mirrored file 323 may be checked against one another such as by comparing error correction or party codes.

At operation 110, a data file 303, after a copy thereof is available in an internal folder 315, may be deleted. At operation 115, printing flow 100 may return, such as to monitoring at operation 105.

Figure 2:
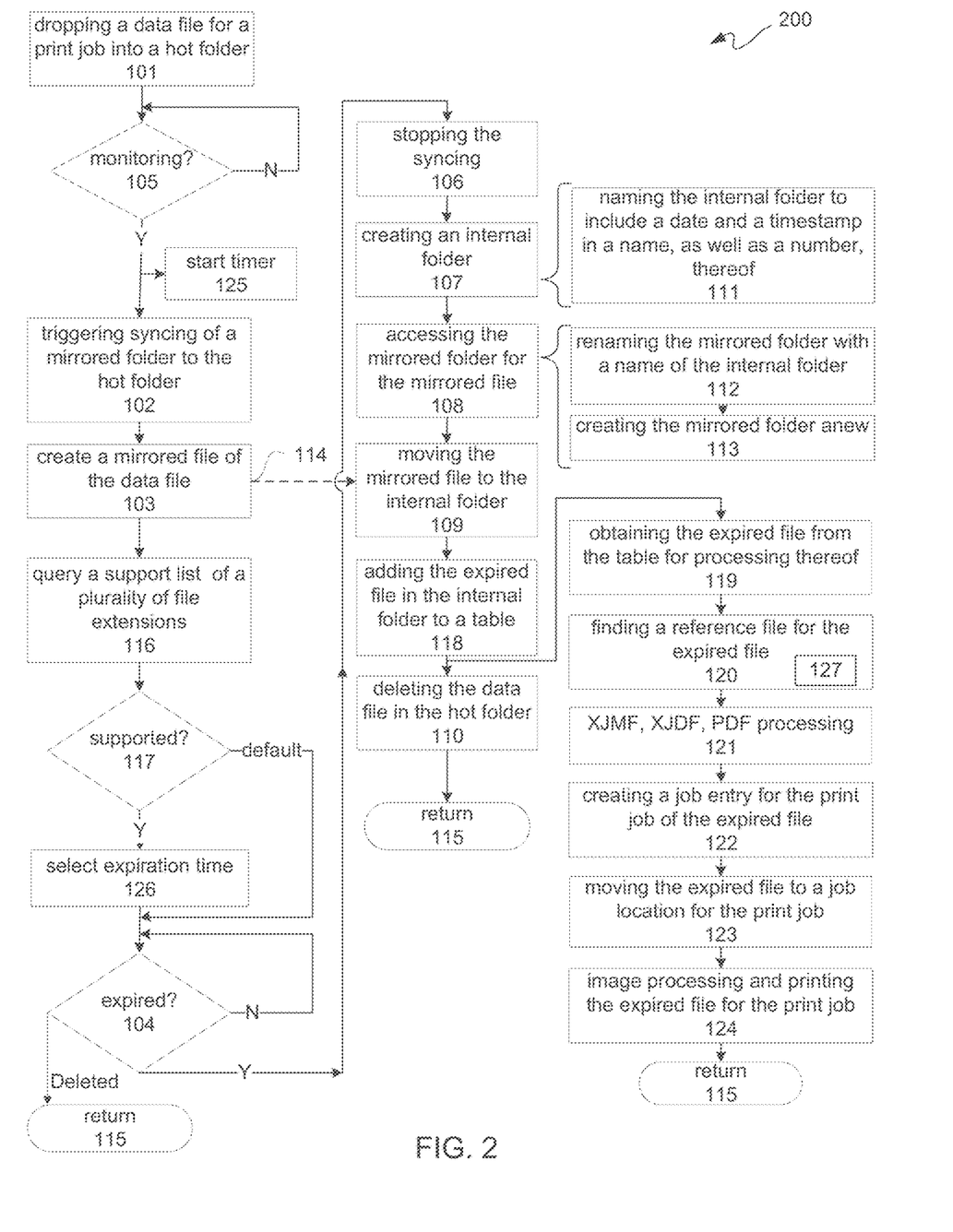
FIG. 2 is a flow diagram depicting another example of a printing flow.

FIG. 2 is a flow diagram depicting another example of a printing flow 200. FIG. 3 is a block diagram depicting an example of a networked system 300 for printing flow 200 of FIG. 2. With simultaneous reference to FIGS. 2 and 3, printing flow 200 and networked system 300 are further described. As printing flow 200 is a more detailed version of printing flow 100, generally only the differences are described below for purposes of clarity and not limitation.

At operation 105, in response to receiving and detecting receipt of a data file 303 in a hot folder 304, at operation 125 a timer module ("timer") 308 of printer system 305 may be initiated to start timing. Such a timing may be a wait time for such a data file 303 in such a hot folder 304 to expire, assuming such data file does stay in such hot folder long enough to expire. Starting of a timer 308 on a data file 303 may be responsive to dropping thereof into hot folder 304.

A hot folder 304 may be configured to support a plurality of file extensions. After creating a mirrored file at operation 103, a support list 317 of such extensions may be queried at operation 116 for such support. At operation 117, it may be determined if a data file 303 has a supported extension. If such a data file does not have a supported extension, namely hated on support list 317, then a default expiration time may be set for such data file 303. Optionally, an unsupported file type may be sent to operation 110 for deletion.

When a data file 303 expires, a mirrored file 313 therefor in a synchronized or mirrored folder 314 may be automatically moved to an internal job folder, namely an internal folder 315, and a shared folder file, such as data file 303, may automatically be deleted. A user may immediately put in a new file into such a shared folder, such as hot folder 304, for subsequent printing. Such a newly added data file to a shared folder to create a print file therefor results in a different print job. Continuing from an internal job folder, an expired file 313 therein may be process based on file pattern. Example file patterns include *.xjmf, *.xjdf, *.pdf, or *.zip, among others. Each file pattern may have an expire time, and such file extension or pattern may be processed as one or more files even though it may or may not reference another file.

If, however, at operation 117 it is determined that such a data file 303 has a support extension, then at operation 126 an expiration time associated with such supported extension of data file 303 may be selected from support list 317, which may be in a form of a table, and set for such data file 303. At operation 104, such default or selected expiration time may be used based on a reading of timer 308. Hot folder 304 is shared by printer system 305, and so may include a defined expiration time for each of a plurality of file extensions on such support list 317. In another example, timer 308 may signal expiration of time on a set of printer job files in a hot folder 304 without monitoring, as in a "watchdog timer."

At operation 118, after moving a mirrored file at operation 109 to an internal folder 315, such a mirrored file 313 may be referred to as an expired file 313. Such an expired file 313 in internal folder 315 may at operation 118 be added to a table 309. Table 309 may be a stack or a queue of one or more print jobs represented by expired files therein. Table 309 may be part of a temporary file system 319 of printer system 305.

Operation 110 may be performed after operation 118, and after operation 118 printing flow 200 may branch to operation 119. At operation 119, an expired file 313 may be obtained from table 309 for subsequent processing for printing. Table 308 may be in memory or other storage of a printer 305; however, in another example a table 309 may be in memory or a storage device external with respect to printer system 305 but accessible by such system.

At operation 120, a reference file 127 for an expired file 313 may be obtained. A reference file 127 may include default print job settings for a print job by printer system 305 or may include a set of previously selected print job settings from a prior print job by printer system 305 or another similar printer system. These print job settings may be used for one or more printing preferences, such as color, page size, staples, and hole punch, among others.

Optionally at operation 104, while waiting for a file or files to expire, monitoring may be used at such operation to analyze such one or more files. For example, a PDF file may be analyzed by printer system 305 to determine how many pages are in such file during a waiting interval prior to reaching a defined expiration time for a data file.

At operation 121, processing of file formats may take place. For purposes of clarity by way of example and not limitation, an XJMF extended job messaging format, an XJDF extended job format, and a PDF portable document format are used. example, Mixed Object: Document Content Architecture or Open XML Paper Specification may be used for a portable document format. Though in this example a data file is a PDF file, other types of files may be used such as for example a PS (PostScript) file, PCL (Printer Command Language) file, or any other type of file that a printer system can process as a print job file.

For an *.xjmf type of a file, such type may have a print job entry created therefor, and such a file type may reference an *.xjdf file to reference or specify a URL. Such a URL may be a local file or a remote file. An example of local URL may have an initial address of file://, and an example of a remote URL may have an initial address of http://. Other than a specified *.xjmf file type, a default xjmf file may be use to create job entry, if an *.xjdf is file type is used. Such a default xjmf file may provide user print job setting and may combine with a default hot folder xjdf file for a print job setting. Furthermore, such an *.xjdf file may reference a PDF file, a PS file, a PCL file, or an ICC the for example using a URL with a file, http, ftp, or other URL address.

For *.pdf or a *.pdf file, such entry may currently not reference any one or more files. However, a default xjmf and default xjdf file or hot folder default xjdf file may be used to create a job entry and job setting for such PDF.

For *.zip folder, such may be unzipped and processed to contain contents of such *.zip folder. An xjmf may be found for such zipped contents, an xjdf in such unzipped folder with such xjmf may be used to create a print job entry from a zip file directory.

In an example, an *.xjdf file may be a default XJDF file resident in a hot folder. Such a default XJDF file may include default print job settings. In this example, a default XJDF file may be obtained at operation 121 to create a print job entry referencing such an *.xjdf file.

In another example, an *.xjdf file may be generated by printer system 305 to provide job settings for a PDF version of a data file, namely an expired file 313. Again, a default XJMF file may be obtained at operation 121 to create a print job entry referencing such an *.xjdf file.

In another example, an XJDF file may be generated with user-selected settings to provide job settings for a PDF version of a data file, namely an expired file 313. An XJMF file referencing such an XJDF file may be obtained or generated to create a print job entry referencing such an XJDF file. In this example, an XJDF reference file 127 may include user-selected job settings for printing of a print job by a printer system 305.

After each file of a set of one or more expired files for a print job, which may include formats covering one or more of XJMF, XJDF, and PDF, is processed at operation 121, at operation 122 a job entry may be created for such a print job for such expired file 313. After a job entry is created and reference resource(s) therefor are gathered, a print job may be ready to be sent to image processing, such as for example a rasterized image processor of a printer system 305, for subsequent printing.

At operation 123, such an expired file 313 may be moved to a job location for a print job. At operation 124, such an expired file 313 for a print job may be image processed and printed by printer system 305. After operation 124, printing flow 200 may return at operation 115 to monitoring at operation 105.

Because one or more of the examples described herein may be implemented using an information processing system, a detailed description of examples of each of a network (such as for a Cloud-based SaaS implementation), a computing system, a mobile device, and an MFP is provided. However, it should be understood that other configurations of one or more of these examples may benefit from the technology described herein.

Figure 4:
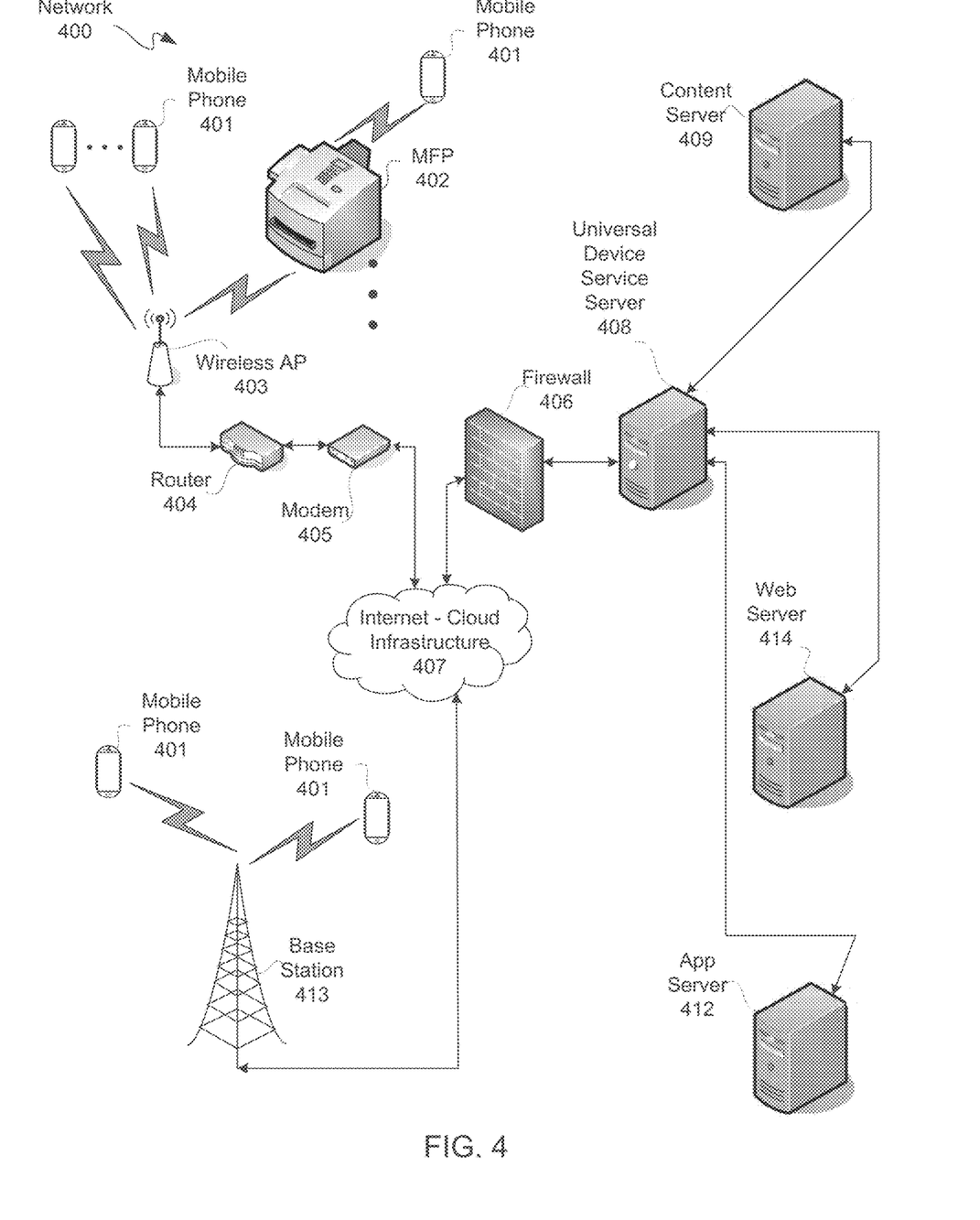
FIG. 4 is a pictorial diagram depicting an example of a network.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to or of a wireless router. Furthermore, one or more of such web-usable wireless devices 401 may be in wireless communication with a base station 413.

Additionally, a desktop computer and/or a printing device, such as for example one or more multi-function printer ("MFPs") 402, each of which may be web-usable devices, may be in wireless and/or wired communication to and from router 404. An MFP 402 may include at least one plasma head as previously described herein.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

Figure 5:
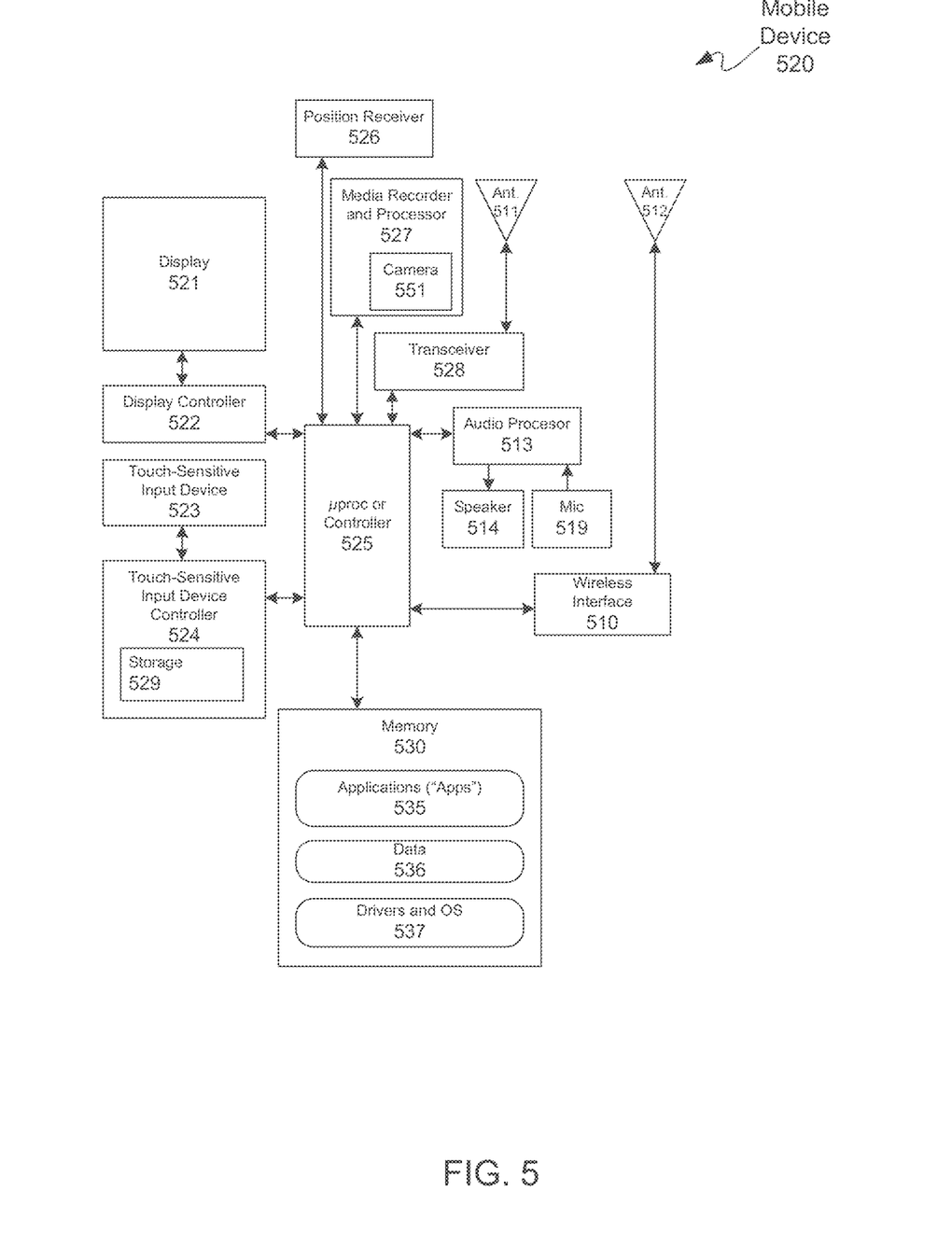
FIG. 5 is a block diagram depicting an example of a portable communication device.

FIG. 5 is a block diagram depicting an example of a portable communication device ("mobile device") 520. Mobile device 520 may be an example of a mobile device used to instruct a printing device.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps, such as a mobile client application as described hereinabove, may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds e.g., podcasts), and so forth.

In this example, memory 530 stores drivers, such as I/O device drivers, and operating system programs ("OS") 537. Memory 530 stores application programs ("apps") 535 and data 536. Data may include application program data. Apps 535 may include an XJDF reference file for a hot folder for communicating to a printer system in place of a printer driver.

I/O device drivers may include software routines accessed through microprocessor or microcontroller 525 or by an OS stored in memory 530. Apps, to communicate with devices such as the touch-sensitive input device 523 and keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera 551, a video camera, an audio recorder, or the like, to capture digital pictures, audio and/or video. Microprocessor or microcontroller 525 may be interconnected for interfacing with media recorder and processor 527. Image, audio and/or video files corresponding to the pictures, songs and/or video may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WIFI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figure 6:
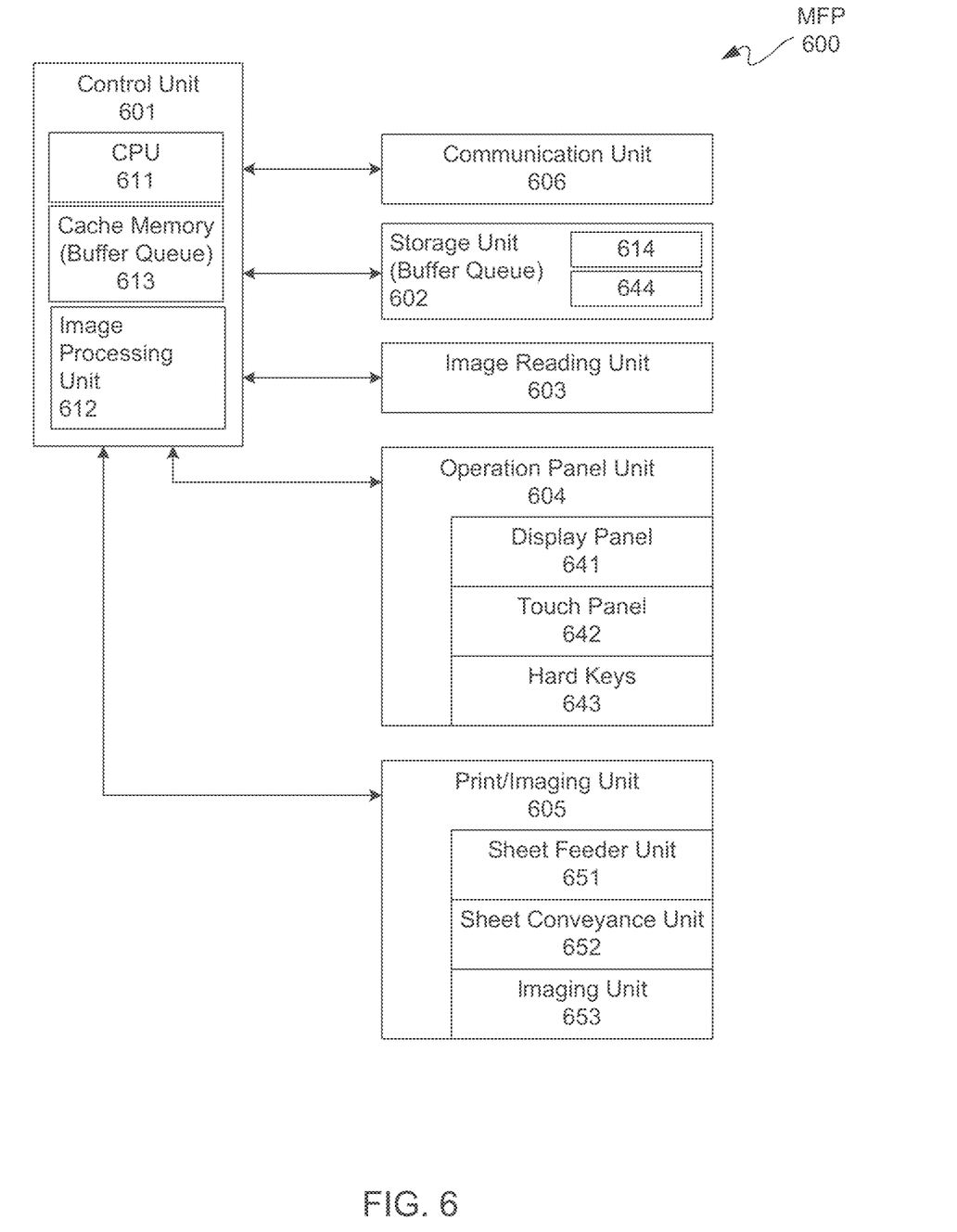
FIG. 6 is a block diagram depicting an example of a multi-function printer (MFP).

FIG. 6 is a block diagram depicting an example of a multi-function printer MFP 600. MFP 600 is provided for purposes of clarity by way of non-limiting example. MFP 600 is an example of an information processing system such as for handling a printer job.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices. Control unit 601 may include a CPU 611, an image processing unit 612, and cache memory 613.

Control unit 601 may be included with or separate from other components of MFP 600. Storage unit 602 may include ROM, RAM, and large capacity storage memory, such as for example an HDD or an SSD. Storage unit 602 may store various types of data and control programs, including without limitation a printer imaging pipeline program 614 and a printer job settings app 644. A buffer queue may be located in cache memory 613 or storage unit 602.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
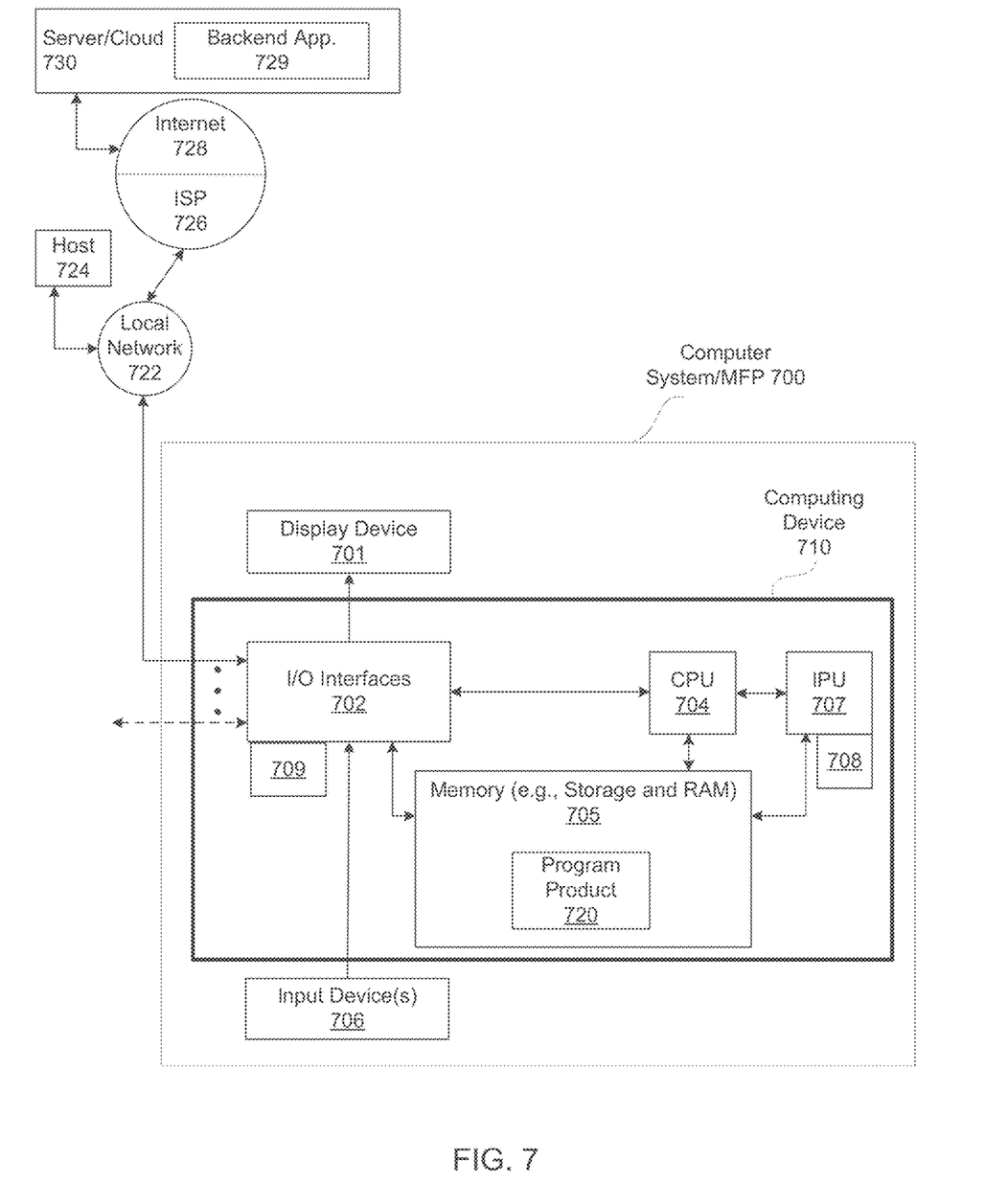
FIG. 7 is a block diagram depicting an example of a computer system.

FIG. 7 is a block diagram depicting an example of a computer system or MFP 700 ("computer system") upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. A example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide a program product 720. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks my be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728, Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WIFI (such as IEEE 802.11a, IEEE 802.11b; IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WIFI), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface or I/O interface 702. In the Internet example, a server 730 might transmit a requested code for an application program through Internet 728, ISP 726, local network 722 and I/O interface 702. A server/Cloud-based system 730 may include a backend application for providing one or more applications or services as described herein. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for printing, comprising:
   dropping a data file for a print job into a hot folder;
   monitoring the hot folder for the dropping;
   responsive to detection of the dropping, triggering syncing of a mirrored folder to the hot folder to create a mirrored file of the data file; and
   responsive to expiration of the data file in the hot folder, stopping the syncing;
   creating an internal folder in a temporary file system;
   accessing the mirrored folder for the mirrored file;
   moving the mirrored file from the mirrored folder to the internal folder; and
   deleting the data file in the hot folder.

2. The method according to claim 1, wherein the mirrored file is moved directly from the mirrored folder to the internal folder in the temporary file system without having to access the hot folder.

3. The method according to claim 2, wherein the mirrored file is created by streaming one or more data files simultaneously into the mirrored folder.

4. The method according to claim 1, wherein the creating of the internal folder includes naming the internal folder to include a date and a timestamp in a name thereof.

5. The method according to claim 4, wherein the name of the internal folder further includes a number.

6. The method according to claim 1, further comprising:
   supporting by the hot folder a plurality of file extensions; and
   checking the data file for a file extension of the plurality of file extensions supported.

7. The method according to claim 6, further comprising checking the data file for the expiration thereof.

8. The method according to claim 7, further comprising adding the expired file in the internal folder to a table in the temporary file system.

9. The method according to claim 8, wherein the hot folder is a network shared folder shared by a printer system, the method further comprising:
   obtaining the expired file from the table for processing thereof;
   finding a reference file for the expired file;
   creating a job entry for the print job of the expired file;
   moving the expired file to a job location for the print job; and
   image processing and printing the expired file for the print job.

10. The method according to claim 9, wherein the printer system includes a configuration application or a webpage to allow a user device to configure or add the hot folder.

11. The method according to claim 10, wherein the reference file includes default job settings for the print job by the printer system.

12. The method according to claim 10, wherein the reference file includes user-selected job settings for the print job by the printer system.

13. The method according to claim 10, wherein the hot folder is shared by the printer system and includes a defined expiration time for each of the plurality of file extensions.

14. The method according to claim 11, further comprising starting a timer on the data file responsive to the dropping thereof into the hot folder.

15. The method according to claim 14, wherein the plurality of extensions include formats covering at least XJMF, XJDF, and PDF.

16. The method according to claim 15, wherein each of the plurality of extension have an associated predetermined expiration time.

17. A system, comprising:
- a printer system having:
  - a memory configured to store program code;
  - a processor couples to the memory; and
  - a printer engine configured for execution of printer operations;
- wherein, in combination and response to executing the program code, the printer system is configured to initiate operations for implementing a process for printing, the process including:
  - dropping a data file for a print job into a hot folder;
  - monitoring the hot folder for the dropping;
  - responsive to detection of the dropping, triggering syncing of a mirrored folder to the hot folder to create a mirrored file of the data file; and
  - responsive to expiration of the data file in the hot folder, stopping the syncing;
  - creating an internal folder in a temporary file system;
  - accessing the mirrored folder for the mirrored file;
  - moving the mirrored file from the mirrored folder to the internal folder; and
  - deleting the data file in the hot folder.

18. The system according to claim 17, wherein the mirrored file is moved directly from the mirrored folder to the internal folder in the temporary file system without having to access the hot folder.

19. The system according to claim 18, wherein the mirrored file is created by streaming one or more data files simultaneously into the mirrored folder.

20. The system according to claim 19, wherein the creating of the internal folder includes naming the internal folder to include a date and a timestamp in a name thereof.

* * * * *